United States Patent
Shimora

(10) Patent No.: US 10,062,088 B2
(45) Date of Patent: Aug. 28, 2018

(54) INFORMATION DISTRIBUTION APPARATUS, INFORMATION DISTRIBUTION METHOD, AND STORAGE MEDIUM

(71) Applicant: YAHOO JAPAN CORPORATION, Tokyo (JP)

(72) Inventor: Hiroki Shimora, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 533 days.

(21) Appl. No.: 14/153,368

(22) Filed: Jan. 13, 2014

(65) Prior Publication Data

US 2014/0257970 A1 Sep. 11, 2014

(30) Foreign Application Priority Data

Mar. 11, 2013 (JP) .................................. 2013-047788

(51) Int. Cl.
G06Q 30/02 (2012.01)

(52) U.S. Cl.
CPC ..... *G06Q 30/0243* (2013.01); *G06Q 30/0277* (2013.01); *G06Q 30/0251* (2013.01)

(58) Field of Classification Search
CPC ........... G06Q 30/0277; G06Q 30/0251; G06Q 30/0246

(Continued)

(56) References Cited

U.S. PATENT DOCUMENTS 7,363,302 B2 4/2008 Lester
2004/0267806 A1 12/2004 Lester
(Continued)

FOREIGN PATENT DOCUMENTS

JP 2001-242842 A 9/2001
JP 2003-233731 A 8/2003
(Continued)

OTHER PUBLICATIONS

Sep. 30, 2014 Office Action issued in Japanese Application No. 2013-047787.
(Continued)

*Primary Examiner* — Vincent M Cao
(74) *Attorney, Agent, or Firm* — Oliff PLC

(57) ABSTRACT

An advertisement distribution device includes: an arrangement position acquisition unit configured to acquire an arrangement position on a display screen of a terminal to display advertisement information; an attention degree index extracting unit configured to extract an attention degree index of the arrangement position based on acquisition of a specific position on the display screen and an attention degree index of the specific position; an arrangement position ranking unit configured to rank a plurality of arrangement positions based on a plurality of attention degree indices extracted by the attention degree index extracting unit; a distribution information ranking unit configured to rank a plurality of pieces of advertisement information based on a predetermined ranking process; and a distribution unit configured to distribute the plurality of pieces of advertisement information based on the ranks of the plurality of pieces of advertisement information and the ranks of the plurality of arrangement positions.

6 Claims, 13 Drawing Sheets

(58) Field of Classification Search
USPC .......................................................... 705/14
See application file for complete search history.

(56) References Cited

U.S. PATENT DOCUMENTS

| | | |
|---|---|---|
| 2005/0149396 A1 | 7/2005 | Horowitz et al. |
| 2006/0095336 A1 | 5/2006 | Heckerman et al. |
| 2008/0263025 A1* | 10/2008 | Koran ............... G06F 17/30864 |
| 2010/0198695 A1* | 8/2010 | Muthukrishnan ...... G06Q 30/02 705/14.71 |
| 2011/0047026 A1* | 2/2011 | Biggs ..................... G06Q 30/02 705/14.46 |
| 2011/0066479 A1* | 3/2011 | Benson ................. G06Q 20/12 705/14.4 |
| 2011/0264522 A1* | 10/2011 | Chan ..................... G06Q 30/02 705/14.52 |
| 2012/0123876 A1 | 5/2012 | Sista et al. |

FOREIGN PATENT DOCUMENTS

| | | |
|---|---|---|
| JP | A-2007-524915 | 8/2007 |
| JP | 2010-073172 A | 4/2010 |
| JP | 2013-506195 A | 2/2013 |
| WO | WO 2005/006282 A2 | 1/2005 |

OTHER PUBLICATIONS

Oct. 28, 2014 Office Action issued in Japanese Application No. 2013-047788.
Apr. 15, 2016 Office Action Issued in U.S. Appl. No. 14/153,360.
Oct. 21, 2016 Office Action issued in U.S. Appl. No. 14/153,360.
U.S. Appl. No. 14/153,360, filed Jan. 13, 2014 in the name of Shimora.

\* cited by examiner

FIG.6

FIRST DATABASE DB1

| ADVERTISEMENT INFORMATION H | ARRANGEMENT POSITION L | CLICK RATE C |
|---|---|---|
| ADVERTISEMENT INFORMATION H1 | L1 | C11 |
| | L2 | C12 |
| | L3 | C13 |
| ADVERTISEMENT INFORMATION H2 | L1 | C21 |
| | L2 | C22 |
| | L3 | C23 |
| ADVERTISEMENT INFORMATION H3 | L1 | C31 |
| | L2 | C32 |
| | L3 | C33 |

FIG.7

SECOND DATABASE DB2

| SPECIFIC POSITION M | ATTENTION DEGREE INDEX F |
|---|---|
| M1 (x1, y1) | ATTENTION DEGREE INDEX F1 |
| M2 (x2, y2) | ATTENTION DEGREE INDEX F2 |
| M3 (x3, y4) | ATTENTION DEGREE INDEX F3 |

FIG.8

THIRD DATABASE DB3

| ADVERTISEMENT INFORMATION H | ARRANGEMENT POSITION L | CLICK RATE C |
|---|---|---|
| ADVERTISEMENT INFORMATION H1 | L1 | CORRECTED C11 |
| | L2 | CORRECTED C12 |
| | L3 | CORRECTED C13 |
| ADVERTISEMENT INFORMATION H2 | L1 | CORRECTED C21 |
| | L2 | CORRECTED C22 |
| | L3 | CORRECTED C23 |
| ADVERTISEMENT INFORMATION H3 | L1 | CORRECTED C31 |
| | L2 | CORRECTED C32 |
| | L3 | CORRECTED C33 |

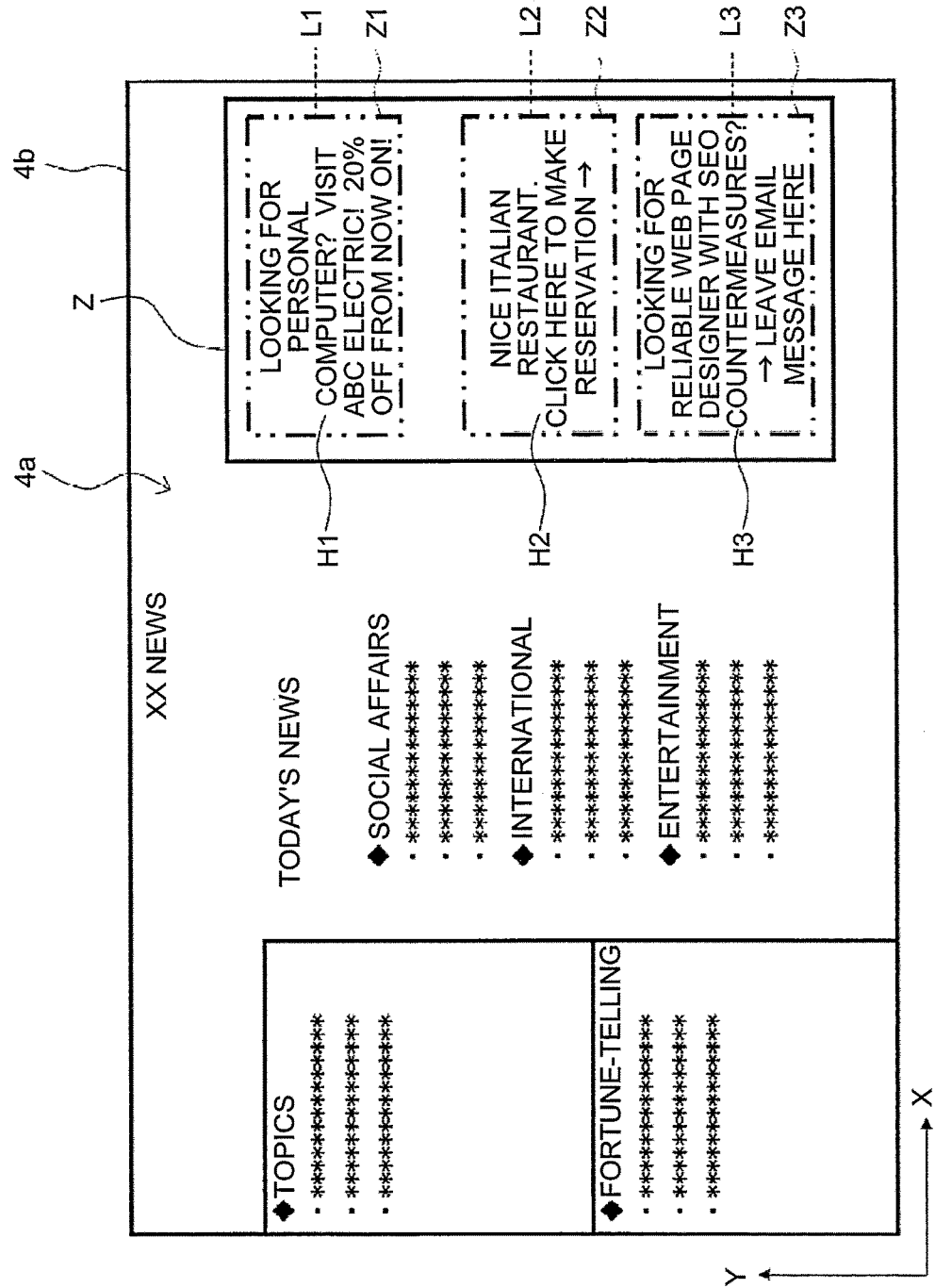

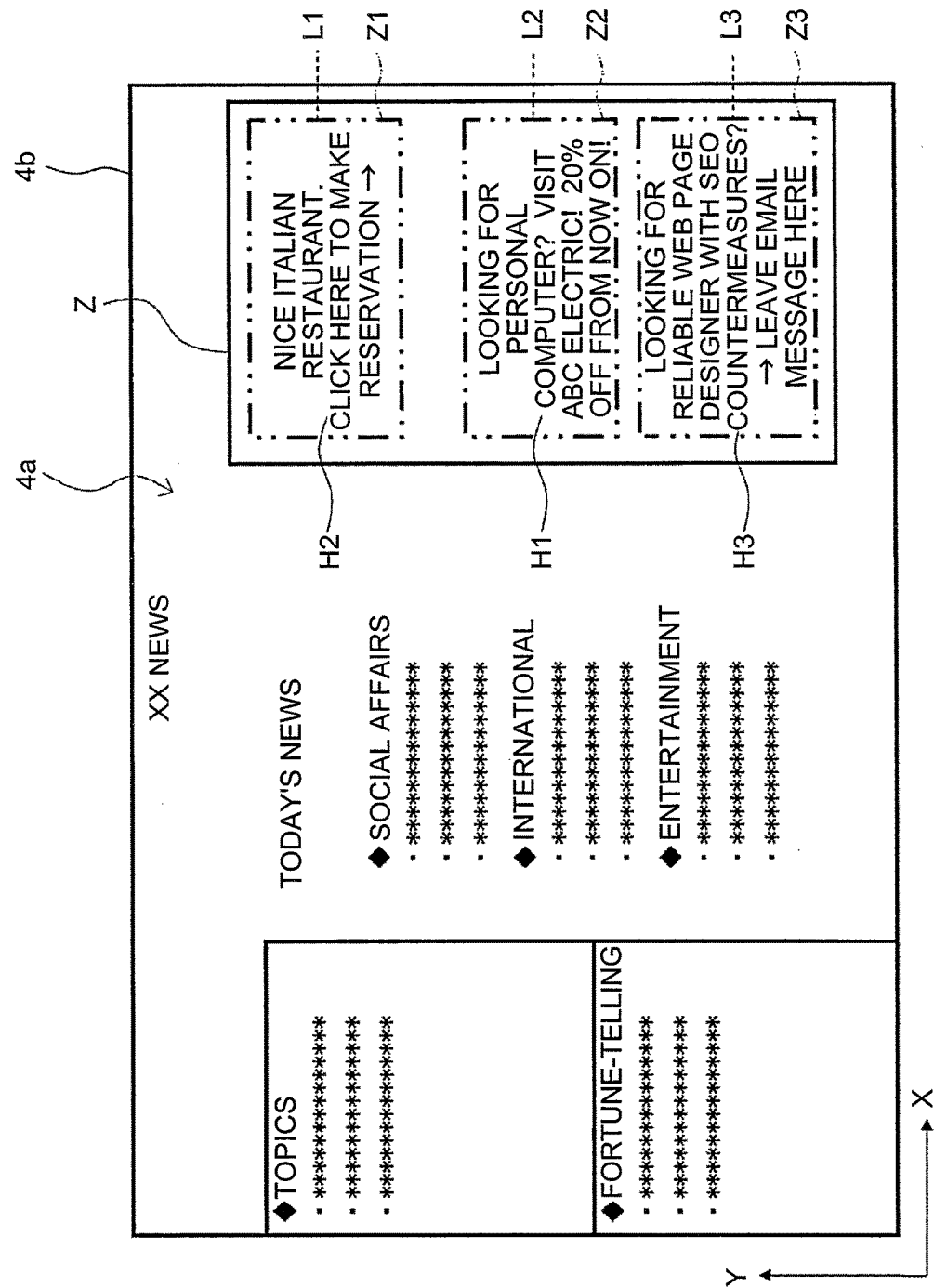

FIG.14A

SECOND DATABASE DB21

| SPECIFIC POSITION M | ATTENTION DEGREE INDEX F |
|---|---|
| M1 (x1, y1) | ATTENTION DEGREE INDEX F1 |
| M2 (x2, y2) | ATTENTION DEGREE INDEX F2 |
| M3 (x3, y4) | ATTENTION DEGREE INDEX F3 |

SECOND DATABASE DB22

| SPECIFIC POSITION M | ATTENTION DEGREE INDEX F |
|---|---|
| M1 (x1, y1) | ATTENTION DEGREE INDEX F1 |
| M2 (x2, y2) | ATTENTION DEGREE INDEX F2 |
| M3 (x3, y4) | ATTENTION DEGREE INDEX F3 |

F2>F3>F1

INFORMATION DISTRIBUTION APPARATUS, INFORMATION DISTRIBUTION METHOD, AND STORAGE MEDIUM

CROSS-REFERENCE TO RELATED APPLICATIONS

The present application claims priority to and incorporates by reference the entire contents of Japanese Patent Application No. 2013-047788 filed in Japan on Mar. 11, 2013.

BACKGROUND OF THE INVENTION

1. Field of the Invention

The present invention relates to an information distribution apparatus, an information distribution method, and a storage medium, and more particularly, to an information distribution apparatus and the like for distributing distribution information such as advertisement information.

2. Description of the Related Art

Conventionally, advertisement information is distributed in such a manner that an advertisement distribution server ranks advertisements and determines a distribution frequency and a distribution position based on the rank. Ranking of advertisement information is performed based on, for example, a click-through rate (CTR: also referred to as a click rate) (for example, see Japanese Laid-open Patent Publication No. 2007-524915).

The CTR of the same advertisement information may change depending on the display position in the page layout displayed on a display screen or the like of a terminal. For example, the attention degree (the easiness to be clicked on) of advertisement information that is ranked on the second rank as a posting position may be different depending on whether the posting position within a page layout of the second advertisement frame is located near the center of the display screen or near the bottom.

Moreover, in a case where advertisement information is posted in a series of Web content that is not fit into one display screen but covers a plurality of screens (views), when a posting position of the advertisement information on the second rank is near the bottom of a first view of the Web content and the posting position of the advertisement information on the third rank is near the top of a second view of the Web content, the attention degree of the third advertisement information may be higher than the attention degree of the second advertisement information.

In this context, "view" means a portion of the entire Web content displayed within the display screen of the terminal. For example, when the Web content contains a large amount of content so that it is necessary to sequentially scroll the Web content to display all content, the portion (although it is not always the top portion, it is generally the content corresponding to one page of the display screen from the top of the Web content) that is displayed on the display screen at the first time is referred to as the first view. Moreover, a portion of the content which is continued from the bottom of the first view and is displayed on the display screen by scrolling down the first view is referred to as the second view.

As above, when a user tries to post advertisement information having a high rank at a posting position having a high attention degree, a reversal phenomenon such that the attention degree of the posting position of advertisement information having a low rank increases may occur depending on the layout of advertisement information within Web content. Thus, the present applicant tried to solve a problem in that advertisement information having a high rank that should originally be posted at a posting position having a high attention degree is posted at a posting position having a low attention degree to cause a disadvantage for the advertisement information having a high rank. The present applicant proposes a new method for distributing advertisement information appropriately according to the attention degree of each posting position within a page layout.

SUMMARY OF THE INVENTION

It is an object of the present invention to at least partially solve the problems in the conventional technology.

In order to solve the above-described problems, an information distribution apparatus according to an exemplary aspect of the present invention includes: an arrangement position acquisition unit configured to acquire each arrangement position of a plurality of pieces of distribution information on a display screen of a terminal that displays distribution information; an attention degree index extracting unit configured to extract each attention degree index of a plurality of arrangement positions based on acquisition of a specific position on the display screen of the terminal and an attention degree index indicating a degree of attention of the specific position; an arrangement position ranking unit configured to ranks the plurality of arrangement positions based on the plurality of attention degree indices extracted by the attention degree index extracting unit; a distribution information ranking unit configured to rank the plurality of pieces of distribution information based on a predetermined ranking process; and a distribution unit configured to distribute the plurality of pieces of distribution information based on the ranks of the plurality of pieces of distribution information and the ranks of the plurality of arrangement positions.

An information distribution method according to another exemplary aspect of the present invention causes a computer to execute: acquiring each arrangement position of a plurality of pieces of distribution information on a display screen of a terminal that displays distribution information; extracting each attention degree index of a plurality of arrangement positions based on acquisition of a specific position on the display screen of the terminal and an attention degree index indicating a degree of attention of the specific position; ranking the plurality of arrangement positions based on the plurality of attention degree indices extracted by the attention degree index extracting unit; ranking the plurality of pieces of distribution information based on a predetermined ranking process; and distributing the plurality of pieces of distribution information based on the ranks of the plurality of pieces of distribution information and the ranks of the plurality of arrangement positions.

A non-transitory computer readable storage medium having stored therein a correction program according to another exemplary aspect of the present invention causes a computer to execute a process, the process comprising: acquiring each arrangement position of a plurality of pieces of distribution information on a display screen of a terminal that displays distribution information; extracting each attention degree index of a plurality of arrangement positions based on acquisition of a specific position on the display screen of the terminal and an attention degree index indicating a degree of attention of the specific position; ranking the plurality of arrangement positions based on the plurality of attention degree indices extracted by the attention degree index extracting unit; ranking the plurality of pieces of distribution information based on a predetermined ranking process; and distributing the plurality of pieces of distribution information based on the ranks of the plurality of pieces of distribution information and the ranks of the plurality of arrangement positions.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an overview of a data structure of a first database;

FIG. 7 is a diagram illustrating an overview of a data structure of a second database;

FIG. 8 is a diagram illustrating an overview of a data structure of a third database;

FIG. 12A is a display example in which content information is displayed in a predetermined page layout on a display screen of a terminal;

FIG. 12B is a display example in which content information is displayed in a predetermined page layout on a display screen of a terminal;

FIG. 14A is a diagram illustrating an overview of a data structure of a second database; and FIG. 14B is a diagram illustrating an overview of a data structure of a second database.

DETAILED DESCRIPTION OF THE PREFERRED EMBODIMENTS

First Embodiment

Figure 1:
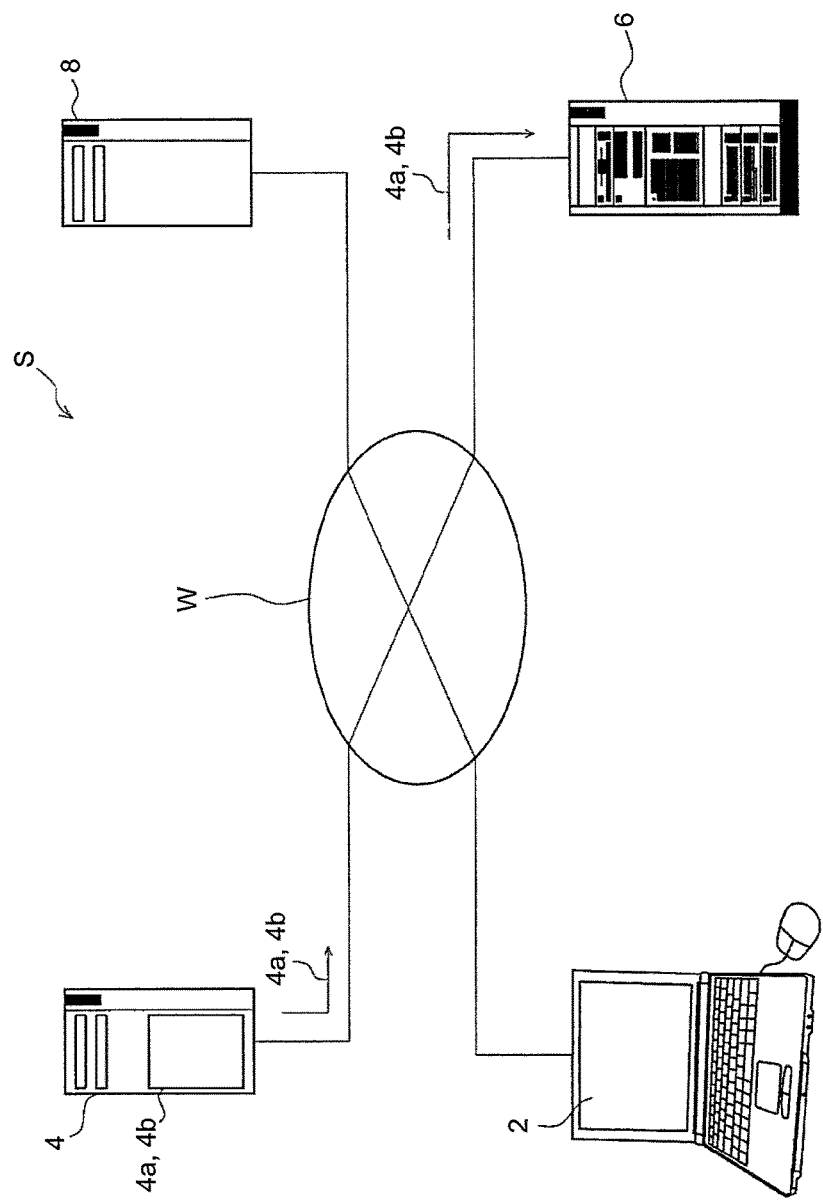
FIG. 1 is a diagram illustrating an entire configuration of a correction system according to a first embodiment.

Hereinafter, a first embodiment will be described with reference to the accompanying drawings. FIG. 1 is a diagram illustrating an entire configuration of a correction system S according to the first embodiment of the present invention. The correction system S includes a terminal 2, a content server 4, a correction device 6, and an advertiser server 8 which are connected via the Internet W.

Terminal 2

The terminal 2 is a terminal that a user possesses, uses, or manages, and includes for example, a mobile phone, a personal computer, a smart phone, a tablet terminal. The terminal 2 has an arithmetic processing unit and a memory integrated therein and includes a display screen. The terminal 2 preferably has an input unit such as a keyboard, and the keyboard may be a software keyboard. The terminal 2 is directly or indirectly connected to the Internet W and can communicate with the content server 4 via the Internet W.

In the terminal 2, advertisement information (distribution information) transmitted from the content server 4 via the Internet W and arranged in a predetermined page layout can be displayed on the display screen using an application program such as an Internet browser, for example.

Content Server 4

The content server 4 provides Web content information (hereinafter referred to simply as content information) to users. Examples of the content information include news information, blog information, Internet shop information, and the like. The content server 4 is configured to be able to transmit and receive information to and from the terminal 2 by wired or wireless and can transmit content information to the terminal 2.

When the content information is displayed on the display screen of the terminal 2, an advertisement frame is arranged in a portion of the page layout of the content information. The advertisement information (distribution information) posted in the advertisement frame is distributed from an advertisement distribution device (not illustrated).

Advertiser Server 8

The advertiser server 8 has a function of providing detailed information on items or the like to the terminal 2 according to a request from the terminal 2. The advertiser server 8 has a site page that constructs an advertiser site, and detailed information of an item or the like is posted in the site page.

In a case where the advertisement information displayed on the terminal 2 is an advertisement such as a banner advertisement, and link information to the advertiser server 8 is embedded in the advertisement, when the advertisement is clicked (selected) by the terminal 2, a request signal is transmitted from the terminal 2 to the advertiser server 8. In response to the request signal, the advertiser server 8 transmits the information on a site page, on which the detailed information of an item or the like is posted, to the terminal 2. The site page of the advertiser server 8 is displayed on the display screen of the terminal 2, and the detailed information of an item or the like is provided to the user of the terminal 2.

Correction Device 6

Figure 2:
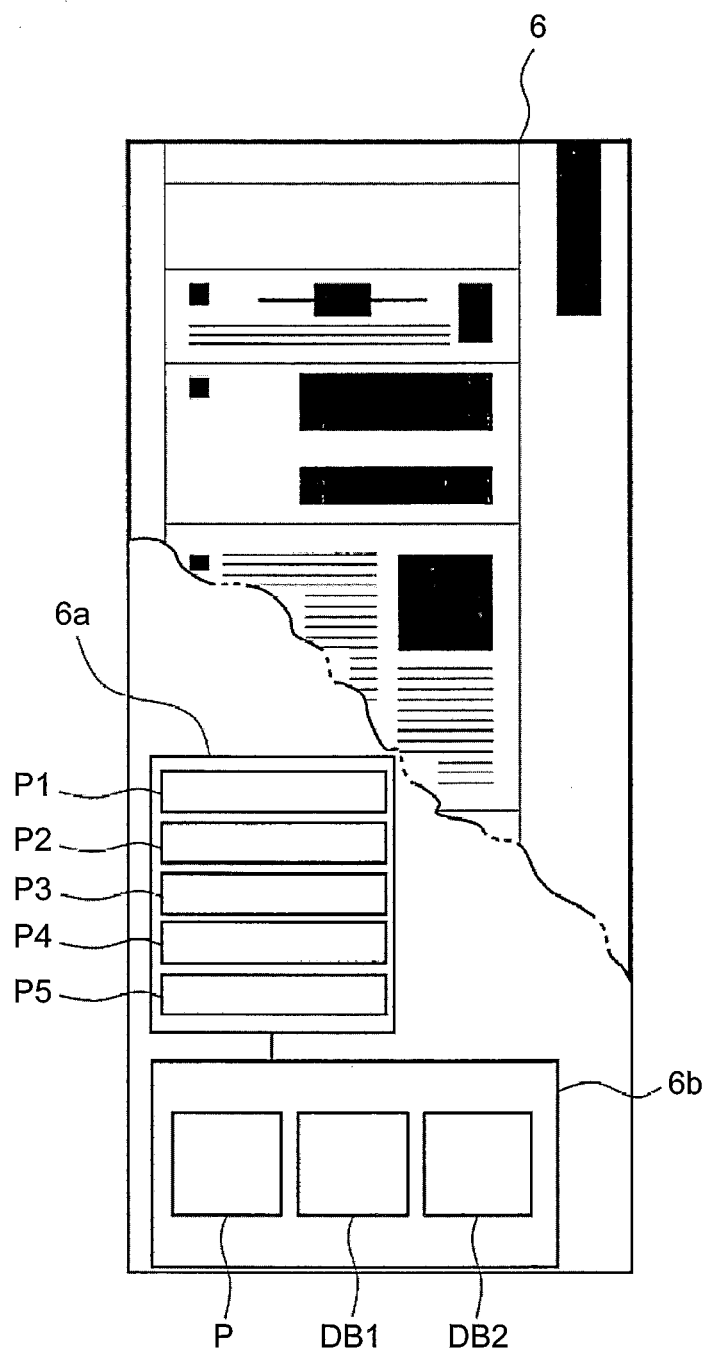
FIG. 2 is a block diagram illustrating an overview of an internal configuration of a correction device.

FIG. 2 is a block diagram illustrating an overview of an internal configuration of the correction device 6. The correction device 6 includes a CPU (arithmetic processing unit) 6a and a memory 6b as a main part of a computer. A correction program P, a first database DB1, and a second database DB2 are stored in the memory 6b.

With the correction program P, the CPU 6a functions as a first acquisition unit P1, a second acquisition unit P2, a first database generation unit P3, a second database generation unit P4, and a correction unit P5. Hereinafter, the respective functions of the CPU 6a realized by the correction program P will be described.

First Acquisition Unit P1

The first acquisition unit P1 has a function of acquiring an arrangement position of the advertisement information in a predetermined page layout when the advertisement information arranged in the predetermined page layout is displayed on the display screen of the terminal 2 and a click rate of distribution information at the arrangement position.

Figure 3:
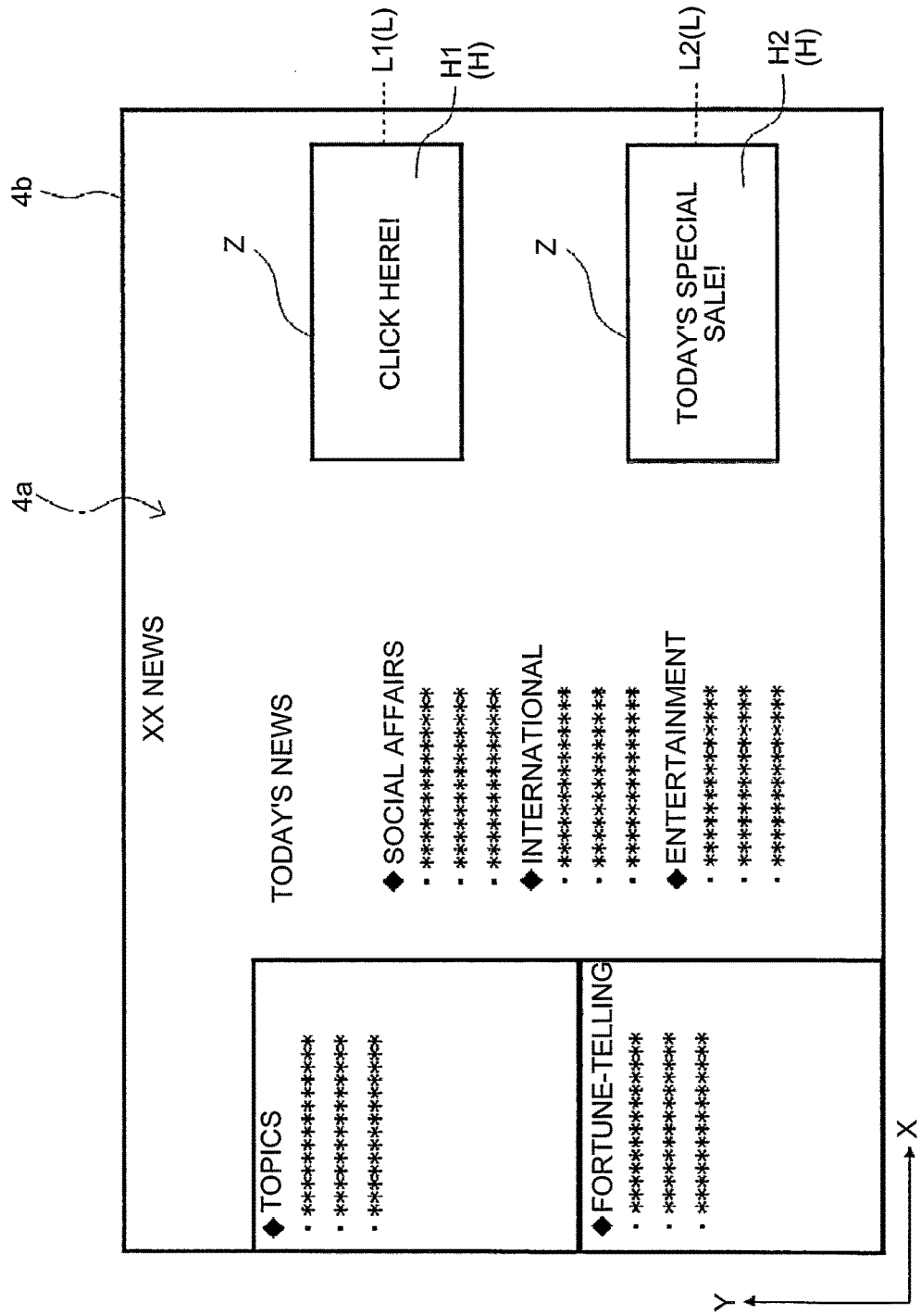
FIG. 3 is a display example in which content information is displayed in a predetermined page layout on a display screen of a terminal.

FIG. 3 is a display example in which content information 4a is displayed in a predetermined page layout 4b on the display screen of the terminal 2. The first acquisition unit P1 acquires arrangement position information L indicating the display position of advertisement information H within the content information 4a displayed in the predetermined page layout 4b on the display screen of the terminal 2. Moreover, the first acquisition unit P1 acquires a click rate (CTR) C indicating how many times the advertisement information H is clicked (selected) at the position correspond to the arrangement position information L.

The arrangement position information L may be an XY coordinate value (a pixel value in XY directions) corresponding to a central portion at the display position within the page layout 4b of the advertisement information H. That is, when the display position within the page layout 4b of the advertisement information H is x1 to x2 in the horizontal direction (X direction) and is y1 to y2 in the vertical direction (Y direction), the XY coordinate value according to the arrangement position information L may be x=(x1+x2)/2 and y=(y1+y2)/2.

Moreover, the arrangement position information L may be the Y coordinate value (the pixel value in the Y direction) of the central position in the vertical direction at the display position within the page layout 4b of the advertisement information H. That is, when the display position within the page layout 4b of the advertisement information H is y1 to y2 in the vertical direction (Y direction), the attachment folded posture L may be (y1+y2)/2 (see FIG. 3).

The arrangement position information L is not particularly limited as long as the information specifies the position of the advertisement information H. Although the XY coordinate value of the central portion of the advertisement information H or the Y coordinate value of the central position in the vertical direction has been described as an example of the arrangement position information L, the arrangement position information L may be the XY coordinate value of the top-left corner of the advertisement information H. The arrangement position information L may be the XY coordinate value of any one of a top-right corner, a bottom-left corner, and a bottom-right corner, the Y coordinate value of the top or the bottom in the vertical direction, and the X coordinate value of the right side or the left side in the horizontal direction.

The click rate C is the percentage of the number of clicks on the advertisement information H to the number of distributions of the advertisement information H to the terminal 2. For example, when the number of distributions is 100 and the number of clicks is 10, the click rate is 10%. The click rate C may be the number that is actually calculated using the past statistical results as described above and may be a predicted CTR (click rate) using a prediction model. The prediction model is a CTR prediction model generated by performing machine learning based on statistical information on whether a specific user has clicked on advertisement information distributed in a specific time period, for example. Based on the predicted CTR, the rate (CTR) of clicks on the distributed advertisement information can be predicted for each user and for each distribution time period, for example. The CTR calculated (predicted) based on the prediction model is a predicted CTR.

Information on the click rate C may be stored for each pixel in the page layout 4b. That is, whenever the user clicks on the advertisement information H, the XY coordinate (pixel coordinate) of a pixel at the clicked position and the number of clicks are stored in correlation, and the click rate C is stored for each pixel coordinate. In this case, the click rate C of the advertisement information H may be the sum of the respective click rates C of the pixel coordinate corresponding to the display position of the advertisement information H.

Second Acquisition Unit P2

The second acquisition unit P2 has a function of acquiring a specific position within the predetermined page layout displayed on the display screen of the terminal 2 and an attention degree index indicating the degree of attention of the specific position as compared to other positions in the predetermined page layout.

Figure 4:
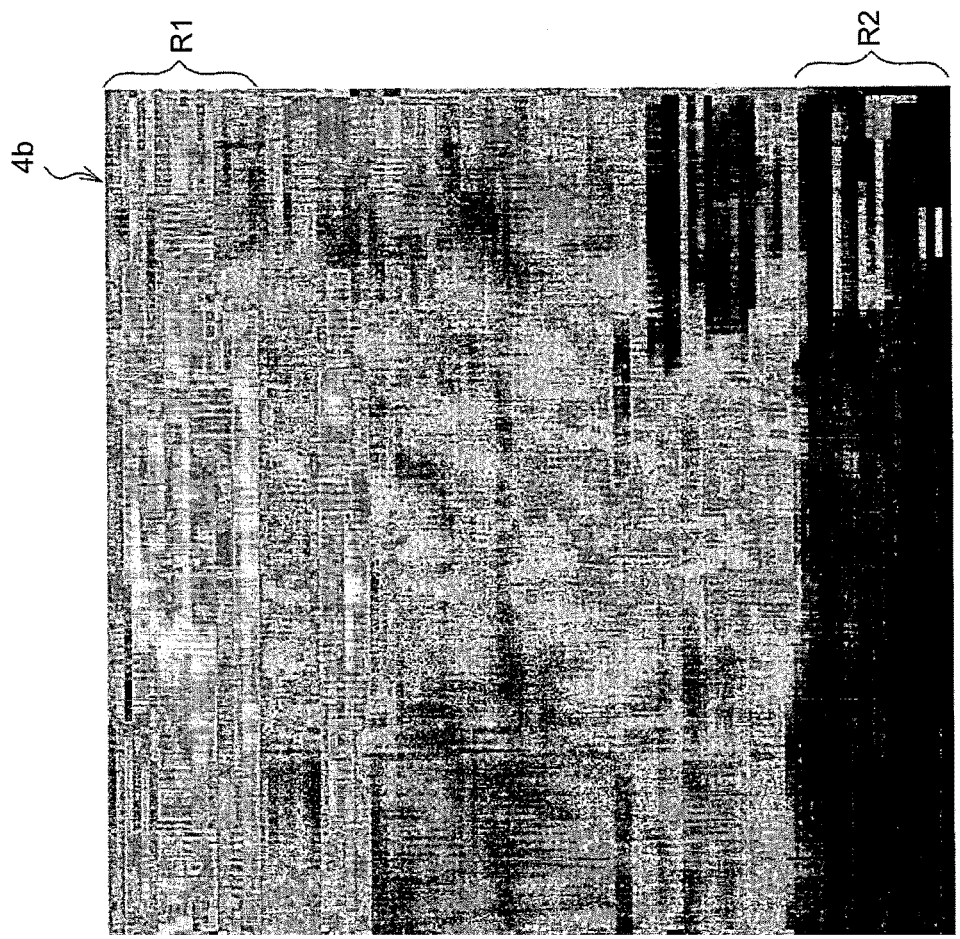
FIG. 4 is a graph illustrating a distribution of a degree (level) of attention at each display position of the predetermined page layout displayed on the display screen of the terminal.

FIG. 4 is a graph illustrating a distribution of the degree (level) of attention at each display position of the predetermined page layout 4b displayed on the display screen of the terminal 2. In FIG. 4, a display position (for example, region R1) having a high attention degree is displayed bright, and a display position (for example, region R2) having a low attention degree is displayed dark. As an overall trend, for example, the display position having a high attention degree is near the top of the page layout 4b and the display position having a low attention degree is near the bottom of the page layout 4b.

The height of the attention degree can be digitized as an attention degree index F. The attention degree index F at a specific position within the page layout 4b can be substituted with the click rate C at the specific position. That is, the click rate C at a specific position with the effect of displayed content eliminated (that is, the click rate C of the specific position as compared to other positions when the same information is displayed) can be conceptualized as the attention degree index F.

The respective display positions (that is, the respective pixel coordinates) in the page layout 4b have respective attention degree indices F (click rates C, that is, the easiness of the pixel coordinate position to be clicked on). The click rate C of a display position of the advertisement information H within the page layout 4b (that is, the click rate C corresponding to the position of the advertisement frame Z in FIG. 3) is the sum of the respective click rates C of the pixel coordinates included in the advertisement frame Z. Thus, the index value of the click rate C corresponding to the advertisement frame Z changes according to the area of the advertisement frame Z. In general, the larger the area of the advertisement frame Z, the larger the click rate C corresponding to the advertisement frame Z, whereas the smaller the area of the advertisement frame Z, the smaller the click rate C corresponding to the advertisement frame Z.

The click rate C corresponding to the position of the advertisement frame Z may be understood as the sum of the respective click rates C of the pixel coordinates as described above and may be understood as the ratio of the arrangement position on the page layout 4b. For example, in the example illustrated in FIG. 4, it may be understood that the region R1 (for example, a range of height within 10% from the top) has a high click rate (for example, 0.5), the region R2 (a range of height within 10% from the bottom) has a low click rate (for example, 0.1), and a region (for example, a range of height within 80% near the center) between the regions R1 and R2 has an intermediate click rate (for example, 0.3), on the page layout 4b.

Figure 5:
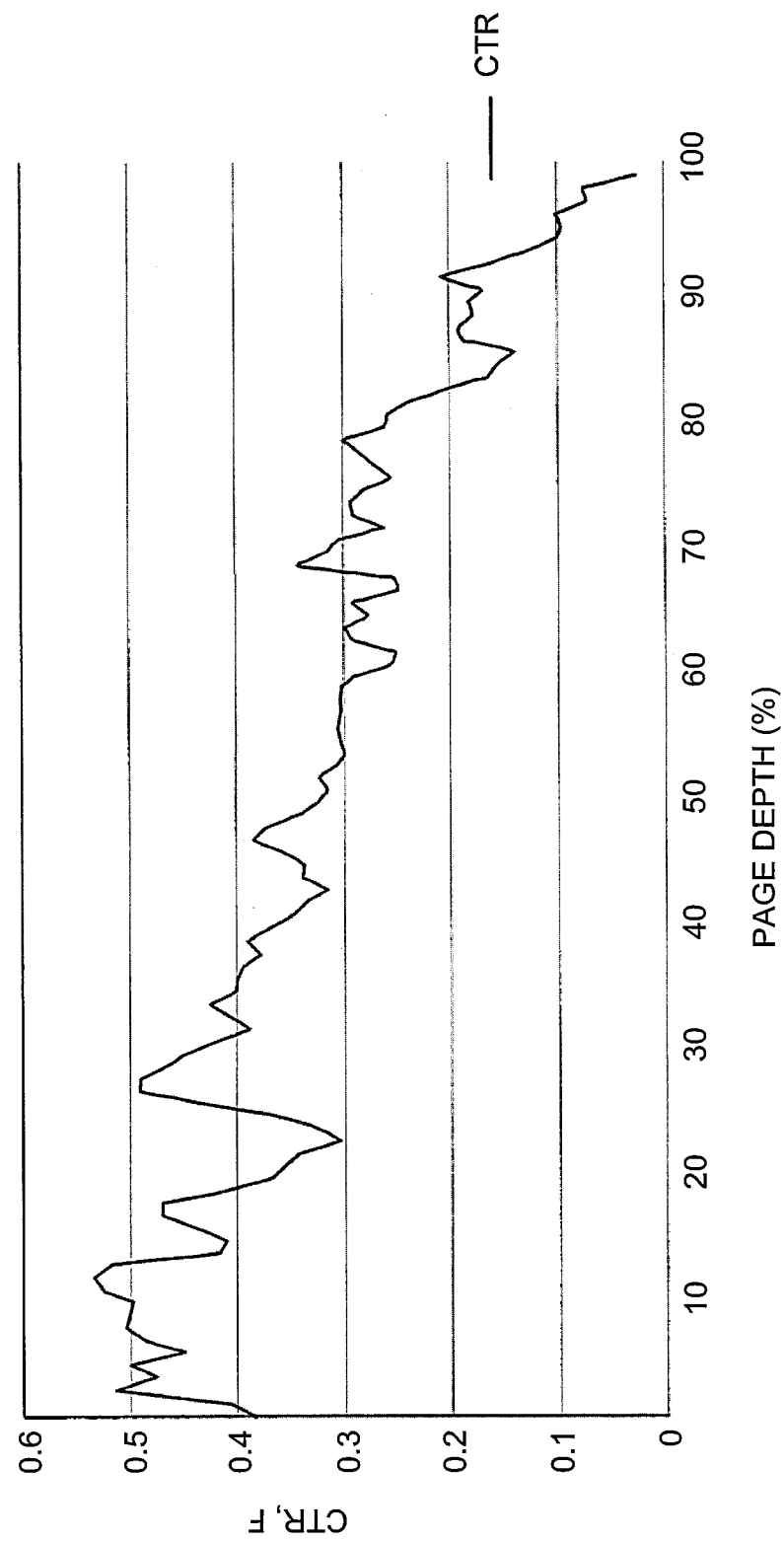
FIG. 5 is a graph illustrating a vertical distribution of an attention degree index at respective display positions within the page layout.

Although the attention degree index F is different depending on the horizontal position within the page layout 4b, as illustrated in FIG. 4, in general, there is a case where the effect of the up-down direction (vertical direction) is larger than the effect of the left-right direction (horizontal direction). Thus, a vertical distribution of the attention degree indices F at the respective display positions within the page layout 4b may be understood as the average in the left-right direction of the attention degree indices F. FIG. 5 is a graph illustrating the vertical distribution of the attention degree indices F at the respective display positions within the page layout 4b. In FIG. 5, the vertical axis is the average in the left-right direction of the attention degree indices F (that is, the click rates C), and the horizontal axis is a vertical position (page depth) within the page layout 4b. The page depth is 0 at the top of the page layout 4b and is 100% at the bottom of the page layout 4b in the display screen.

First Database Generation Unit P3

The first database generation unit P3 has a function of generating a database storing the arrangement position of the advertisement information H acquired by the first acquisition unit P1 and the click rate of the advertisement information H at the arrangement position as a first database DB.

FIG. 6 is a diagram illustrating an overview of a data structure of the first database DB1. The first database DB1 is constructed for each advertisement information H so that the arrangement position information L and the click rate C are correlated. For example, C11 is a click rate when the advertisement information H1 is displayed as the arrangement position L1. C12 is a click rate when the advertisement information H1 is displayed as the arrangement position L2. C21 is a click rate when the advertisement information H2 is displayed as the arrangement position L1.

Whenever the advertisement information H is distributed, the first acquisition unit P1 acquires the arrangement position information L and the click rate C at the arrangement position, which are stored in the first database DB1. The more the number of pieces of information acquired, the more the accuracy of the information stored in the first database DB1 is improved. That is, information on the click rate C when specific advertisement information H is displayed at a certain arrangement position in the page layout 4b is stored with high accuracy. Moreover, information on the click rate C of certain advertisement information when a plurality of pieces of advertisement information is displayed at a specific arrangement position L in the page layout 4b is stored with high accuracy.

Second Database Generation Unit P4

The second database generation unit P4 has a function of generating a database storing a specific position within the page layout 4b acquired by the second acquisition unit P2 and an attention degree index of the specific position as a second database DB2.

FIG. 7 is a diagram illustrating an overview of a data structure of the second database DB2. The second database DB2 is constructed so that a specific position M in the page layout 4b and the attention degree index F at the specific position M are correlated. The specific position M is the XY coordinate in the page layout 4b, for example. The attention degree index F is the click rate C at the specific position M, for example.

Thus, the second database DB2 may be constructed such that the XY coordinate of each display position of the graph illustrated in FIG. 4 is the specific position M and the brightness (the degree of attention) at each display position is expressed by the attention degree index F (click rate C). Moreover, when the factor in the vertical direction only is taken into consideration without taking the factor in the left-right direction within the page layout 4b into consideration, the horizontal axis (the Y coordinate of the specific position) of the graph illustrated in FIG. 5 may be the specific position M and the vertical axis may be the attention degree index F.

The second database DB2 may be generated by displaying specific information for creating database at respective positions within the page layout 4b, measuring the click rates C of the display positions, and storing the click rate data. Moreover, when specific information for creating database is not prepared, the second database DB2 may be generated based on the relation between a plurality of arrangement positions L within the page layout 4b of specific advertisement information H (for example, the advertisement information H1) and the click rates C at the respective arrangement positions. That is, the data of the specific advertisement information H1 in the first database DB1 may be used as the data of the second database DB2.

Correction Unit P5

The correction unit P5 has a function of correcting the click rate C of the advertisement information H based on the attention degree index F of the specific position M corresponding to the arrangement position L of the advertisement information H. Specifically, with regard to the specific advertisement information H, the specific position M corresponding to the arrangement position L acquired by the first acquisition unit P1 and the attention degree index F of the specific position M are extracted based on the second database DB2. When the attention degree index F of the specific position M is higher or lower than the attention degree index F of another position, the correction unit P5 corrects the click rate C at the distribution position L of the advertisement information H according to the respective situations.

For example, when the arrangement position L2 of the advertisement information H1 corresponds to the specific position M2, and the attention degree index F2 corresponding to the specific position M2 has an attention degree lower than that of the attention degree index F (F1, F3, or the like) corresponding to another position M (M1, M3, or the like), the click rate C12 corresponding to the arrangement position L2 of the advertisement information H1 is corrected to be higher. In this way, it is possible to improve the situation in which the click rate C12 of the advertisement information H1 is low due to the arrangement position L2 and to correct the click rate C12 of the advertisement information H1 to an appropriate value (a value in which the effect of the arrangement position is reduced).

When the arrangement position L3 of the advertisement information H1 corresponds to the specific position M3, and the attention degree index F3 corresponding to the specific position M3 has an attention degree higher than that of the attention degree index F (F1, F2, or the like) corresponding to another position M (M1, M2, or the like), the click rate C13 corresponding to the arrangement position L3 of the advertisement information H1 is corrected to be lower. In this way, it is possible to improve the situation in which the click rate C13 of the advertisement information H1 is high due to the arrangement position L3 and to correct the click rate C13 of the advertisement information H1 to an appropriate value (a value in which the effect of the arrangement position is reduced).

Here, the attention degree index at the other position compared with the specific position M2 may be the average of the attention degree indices of all specific positions M other than the specific position M2 in the second database DB2 and may be the average of the attention degree indices of all specific positions M including the specific position M2. The "attention degree index of the other position" is not particularly limited to the attention degree index of a particular position as long as it can be used for comparison.

As a specific example, the correction unit P5 may perform a correction process in the following manner. A case of correcting the click rate C12 at the arrangement position L2 of the advertisement information H1, the click rate C13 at the arrangement position L3 of the advertisement information H1, and the click rate C22 at the arrangement position L2 of the advertisement information H2 will be described. It is assumed that the average of the attention degree indices F of all specific positions M in the second database DB2 is 100 as a relative value, the attention degree index F2 of the specific position M2 corresponding to the arrangement position L2 is 80, and the attention degree index F3 of the specific position M3 corresponding to the arrangement position L3 is 200.

The click rates C12 and C22 at the arrangement position L2 of the pieces of advertisement information H1 and H2 are 80% as compared to the overall attention degree. Thus, the correction unit P5 multiplies the click rates C12 and C22 with a correction coefficient 1.25. The click rate C13 at the arrangement position L3 of the advertisement information H1 is 200% due to the arrangement position as compared to the overall attention degree. Thus, the correction unit P5 multiplies the click rate C13 with a correction coefficient 0.5. In this manner, the correction unit P5 may correct the click rate by the ratio as compared to the attention degree index of the other position.

A third database generation unit (not illustrated) as the function of the CPU 6a realized by the correction program P may generate a third database DB3 (see FIG. 8), and the corrected click rates C12, C13, and C22 may be stored in correlation with the pieces of advertisement information H (H1 to H3) and the arrangement positions L (L1 to L3).

Correction Process

Figure 9:
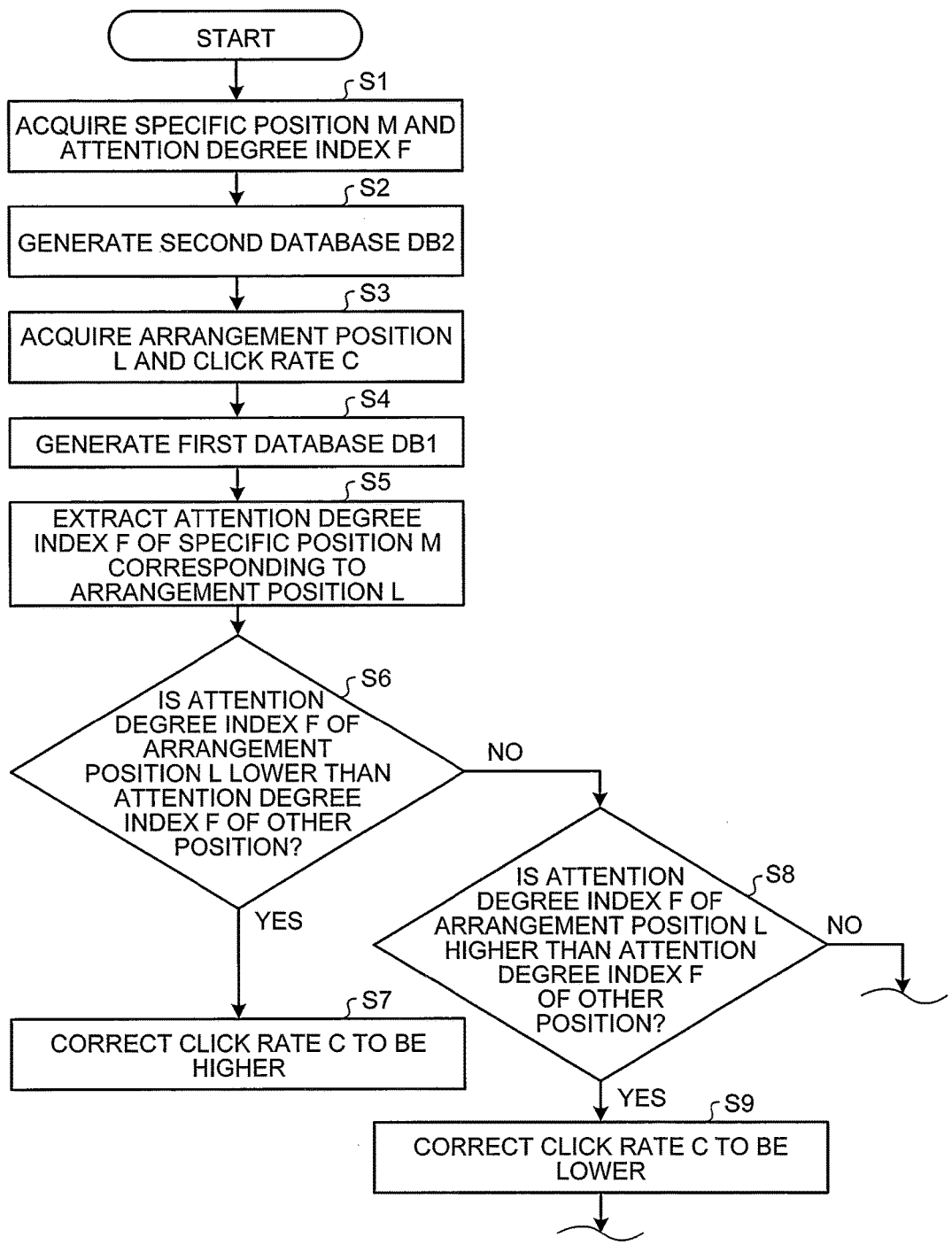
FIG. 9 is a flowchart for describing a correction process according to the first embodiment.

Next, the correction process of the correction device 6 will be described with reference to the flowchart of FIG. 9.

The correction device 6 acquires the specific position M in the page layout 4b displayed on the display screen of the terminal 2 and the attention degree index F at the specific position M (S1). The correction device 6 acquires the attention degree indices F at all positions in the page layout 4b to store attention degree index data and generates the second database DB2 (S2).

When the advertisement information H is distributed to the terminal 2, the correction device 6 acquires the arrangement position L of the advertisement information H in the page layout 4b displayed on the display screen of the terminal 2 and the click rate C of the advertisement information H at the arrangement position L (S3). The correction device 6 generates the first database DB1 by storing the acquired arrangement position L and click rate C in correlation with the advertisement information H (S4). The correction device 6 extracts the attention degree index F of the specific position M corresponding to the arrangement position L (S5). When the attention degree index F of the specific position M corresponding to the arrangement position L is lower than the attention degree index F of other position (S6), the click rate C is corrected to be higher (S7). When the attention degree index F of the specific position M corresponding to the arrangement position L is higher than the attention degree index F of other position (S8), the click rate C is corrected to be lower (S9).

In the first embodiment, an example in which a plurality of advertisement frames Z is arranged in the page layout 4b, and the advertisement information H is distributed to each of the advertisement frames Z has been described. For example, when the advertisement information is a banner image, there is a case where one banner image is distributed to one advertisement frame Z. However, a plurality of pieces of advertisement information may be distributed to one advertisement frame Z. For example, a plurality of pieces of advertisement information (text advertisements) mainly composed of text information in which a link is embedded may be distributed to one advertisement frame Z. In this case, the arrangement positions of the respective pieces of advertisement information are the display positions of the text advertisements in one advertisement frame Z.

Second Embodiment

Figure 10:
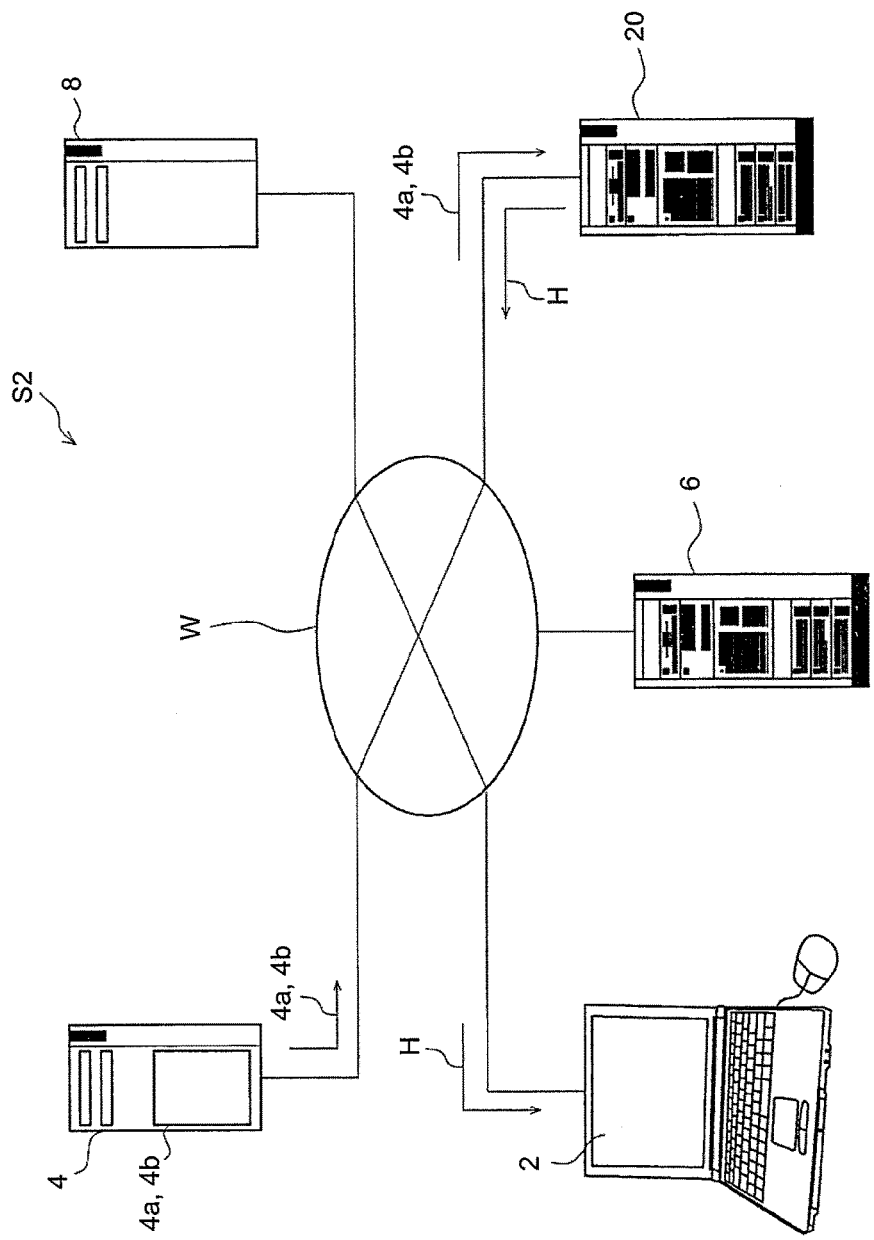
FIG. 10 is a diagram illustrating an entire configuration of an advertisement distribution system according to a second embodiment.

Hereinafter, the second embodiment will be described with reference to the drawings. In the second embodiment, the same constituent components as those of the first embodiment will be denoted by the same reference numerals, and description thereof will not be provided. FIG. 10 is a diagram illustrating an entire configuration of an advertisement distribution system S2 according to the second embodiment. The advertisement distribution system S2 includes a terminal 2, a content server 4, a correction device 6, an advertiser server 8, and an advertisement distribution device (information distribution apparatus) 20 which are connected so as to be able to transmit and receive information via the Internet W.

In the second embodiment, the configuration and function of the terminal 2, the content server 4, the correction device 6, and the advertiser server 8 are substantially the same as those of the first embodiment, and detailed description thereof will not be provided.

Advertisement Distribution Device 20

Figure 11:
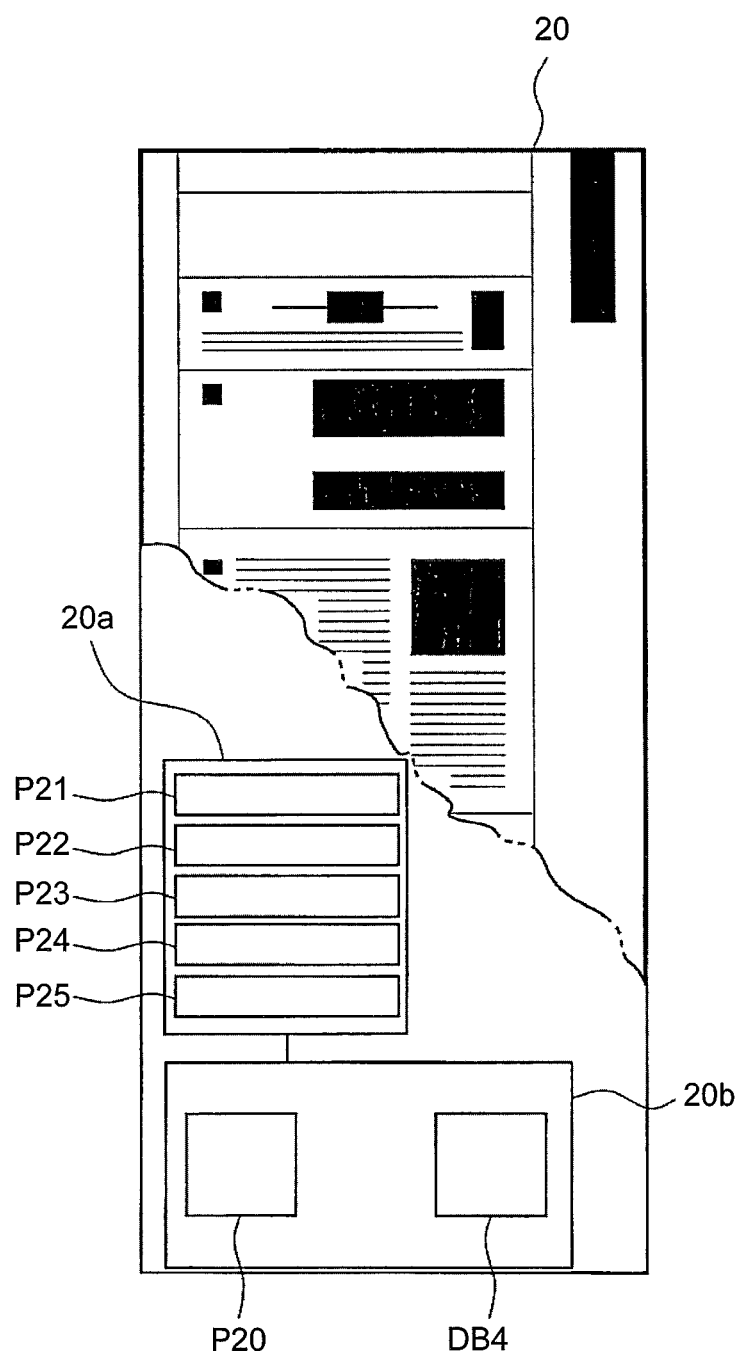
FIG. 11 is a block diagram illustrating an overview of an internal configuration of an advertisement distribution device.

FIG. 11 is a block diagram illustrating an overview of an internal configuration of the advertisement distribution device 20. The advertisement distribution device 20 includes a CPU (arithmetic processing unit) 20a and a memory 20b as a main part of a computer. An advertisement distribution program P20 and an advertisement information database DB4 are stored in the memory 20b. The advertisement information database DB4 may be stored in another device different from the advertisement distribution device 20.

With the advertisement distribution program P20, the CPU 20a functions as an arrangement position acquisition unit P21, an attention degree index extracting unit P22, an arrangement position ranking unit P23, an advertisement information ranking unit (distribution information ranking unit) P24, and a distribution unit P25. Hereinafter, the respective functions of the CPU 20a realized by the advertisement distribution program P20 will be described.

Arrangement Position Acquisition Unit P21

The arrangement position acquisition unit P21 has a function of acquiring the arrangement positions L of a plurality of pieces of advertisement information H on the display screen of the terminal 2 that displays the plurality of pieces of advertisement information H. Specifically, when the terminal 2 accesses the content server 4, the information on the page layout 4b on the display screen of the content information 4a is transmitted from the content server 4 to the advertisement distribution device 20. The arrangement position acquisition unit P21 acquires the information on the page layout 4b.

The information on the page layout 4b includes information on the arrangement position of the advertisement frame in the page. That is, the information on the page layout 4b includes the information on the arrangement position L when the advertisement information H is distributed and arranged in the page layout 4b. The information on the arrangement position L may be the position information of the central portion in the vertical direction of each advertisement frame.

Attention Degree Index Extracting Unit P22

The attention degree index extracting unit P22 has a function of extracting the attention degree indices F of the plurality of arrangement positions L when the specific position M on the display screen of the terminal 2 and the attention degree index F at the specific position M are acquired. Here, the specific position M is an optional point on the display screen rather than one point on the display screen of the terminal 2 and is preferably all points. The relation between the specific position M on the display screen and the attention degree index F corresponding to the specific position M is stored in the second database DB2 in the correction device 6. Thus, the attention degree index extracting unit P22 may acquire the attention degree index F corresponding to the specific position M from the correction device 6.

The attention degree index extracting unit P22 compares the acquired specific position M and the arrangement position L of the advertisement information H and specifies the specific position M corresponding to the arrangement position L of the advertisement information H. Moreover, the attention degree index extracting unit P22 extracts the attention degree index F corresponding to the specified specific position M. In this way, it is possible to obtain an index indicating the extent in which the arrangement position L of the advertisement information H (that is, the position of the advertisement frame in the page layout 4b) gather attention from the user as compared to other positions. When the advertisement information H is arranged at a plurality of arrangement positions L in the page layout 4b, the attention degree index extracting unit P22 extracts a plurality of attention degree indices F corresponding to the respective arrangement positions L.

Arrangement Position Ranking Unit P23

The arrangement position ranking unit P23 has a function of ranking the plurality of arrangement positions L based on the plurality of attention degree indices F extracted by the attention degree index extracting unit P22. For example, as illustrated in FIG. 12A, when one advertisement frame Z is arranged in the page layout 4b, and display areas Z1, Z2, and Z3 for displaying text advertisements are arranged in the advertisement frame Z in that order from the top, it is necessary to set the ranks of the display areas Z1, Z2, and Z3 in advance according to the conventional ranking method that does not take the attention degree index F into consideration. In general, the first, second, and third ranks are often set in that order from the top.

When the pieces of advertisement information H (H1 to H3) as text advertisements to be distributed are ranked such that the advertisement information H1 is on the first rank, the advertisement information H2 is on the second rank, and the advertisement information H3 is on the third rank, the advertisement information H1 is distributed to the display area Z1, the advertisement information H2 is distributed to the display area Z2, and the advertisement information H3 is distributed to the display area Z3.

The arrangement position ranking unit P23 of the second embodiment automatically ranks the display areas Z1 to Z3 based on the attention degree indices F of the respective display areas. That is, when the attention degree index F2 of the display area Z2 has the highest attention degree, the attention degree index F1 of the display area Z1 has the next highest attention degree, and the attention degree index F3 of the display area Z3 has the lowest attention degree, the display area Z2 is on the first rank, the display area Z1 is on the second rank, and the display area Z3 is on the third rank. As illustrated in FIG. 12B, according to the ranks of the display areas Z1 to Z3, the advertisement information H1 can be distributed to the display area Z2 having the highest attention degree, the advertisement information H2 can be distributed to the display area Z1 having the next highest attention degree, and the advertisement information H3 can be distributed to the display area Z3 having the lowest attention degree.

Advertisement Information Ranking Unit P24

The advertisement information ranking unit P24 has a function of ranking the plurality of pieces of advertisement information H (H1 to H3) based on a predetermined ranking process. The ranking process of the advertisement information H may be performed based on a click rate C or a unit price of the advertisement information H, and detailed description will not be provided because an existing technique can be applied. Moreover, the advertisement information H can be ranked based on the genre of the content information 4a on which the advertisement information H is posted or a behavior history of the user of the terminal 2 of a distribution destination. This will be described later.

The plurality of pieces of advertisement information H1 to H3 is ranked based on the function of the advertisement information ranking unit P24. In the second embodiment, the advertisement information H1 is ranked on the first rank, the advertisement information H2 is ranked on the second rank, and the advertisement information H3 is ranked on the third rank.

Distribution Unit P25

The distribution unit P25 has a function of distributing a plurality of pieces of advertisement information H based on the ranks of a plurality of pieces of advertisement information H and the ranks of a plurality of arrangement positions L. Here, the plurality of pieces of advertisement information H is the pieces of advertisement information H1 to H3. The plurality of arrangement positions L is the arrangement positions L1 to L3 in the page layout 4b to which the pieces of advertisement information H1 to H3 is distributed, and in the second embodiment, is the arrangement positions of the advertisement frames Z1 to Z3.

The distribution unit P25 distributes the pieces of advertisement information H1 to H3 based on the attention degree indices F1 to F3 of the arrangement positions L1 to L3 so that the advertisement information H1 is posted on the display area Z2, the advertisement information H2 is posted on the display area Z1, and the advertisement information H3 is posted on the display area Z3. The ultimate distribution destination of the pieces of advertisement information H1 to H3 is the terminal 2. The pieces of advertisement information H1 to H3 may be distributed directly to the terminal 2, and the respective pieces of advertisement information H1 to H3 may be distributed to the content server 4 so that the respective pieces of advertisement information H1 to H3 are transmitted from the content server 4 to the terminal 2 together with the content information 4a.

Figure 13:
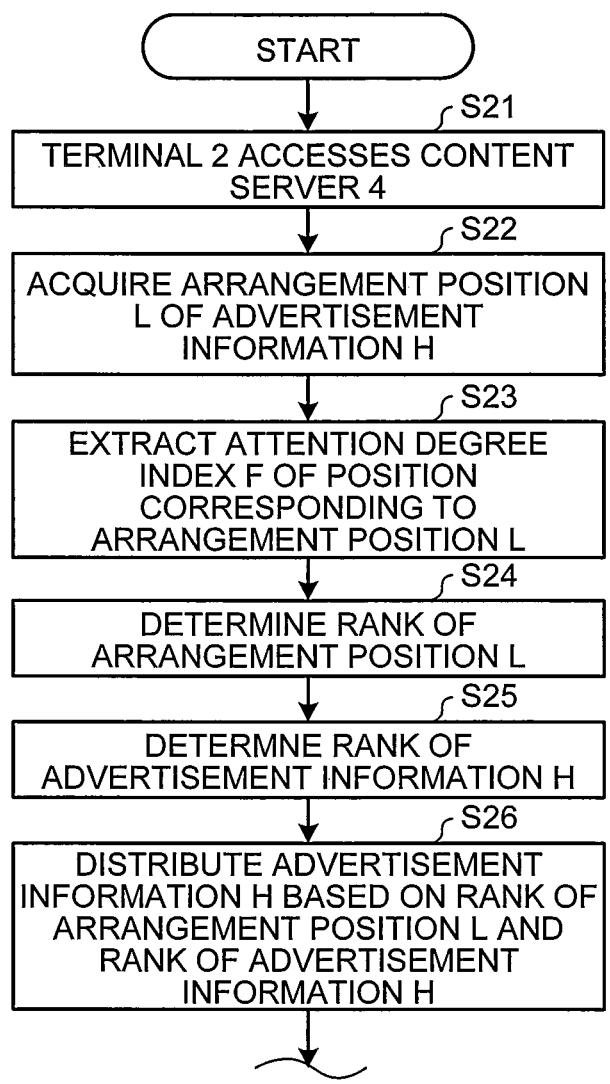
FIG. 13 is a flowchart for describing an advertisement distribution process according to the second embodiment.

Next, the advertisement distribution process will be described with reference to the flowchart of FIG. 13.

When the terminal 2 accesses the content server 4 (S21), the page layout 4b is transmitted from the content server 4 to the advertisement distribution device 20, and the advertisement distribution device 20 acquires the arrangement positions L (L1 to L3) (the positions of the display areas Z1 to Z3) of the advertisement information H in the page layout 4b (S22). The advertisement distribution device 20 extracts the attention degree indices F (F1 to F3) of the positions corresponding to the acquired arrangement positions L (L1 to L3) based on the relation between the specific position M of the page layout 4b and the attention degree index F (S23).

The advertisement distribution device 20 ranks the arrangement positions L (L1 to L3) based on the attention degree indices F (F1 to F3) of the arrangement positions L (L1 to L3) (S24). The advertisement distribution device 20 ranks the pieces of advertisement information H (H1 to H3) to be distributed based on a predetermined process (S25). The advertisement distribution device 20 distributes the advertisement information based on the ranks of the arrangement positions L (L1 to L3) and the pieces of advertisement information H (H1 to H3) so that the advertisement information H1 is posted on the display area Z2, the advertisement information H2 is posted on the display area Z1, and the advertisement information H3 is posted on the display area Z3 (S26).

First Modification

In the second embodiment, although the genre of the content information 4a is not taken into consideration, the arrangement positions may be ranked according to the difference in the genre of the content information 4a. Here, the genre of the content information 4a means a category and a domain name of the content information 4a and a similarity of page layouts, for example.

The category means the type of a site page such as a blog site, a shopping site, or a news site. The domain name means that the same or similar domain names of the content server 4 are treated as the same genre, and different domain names are treated as another genre, for example. The similarity of page layouts means that site pages having a similar page layout are treated as the same genre, and site pages having largely different page layouts are treated as another genre, for example. The similarity is determined based on predetermined criteria. For example, the similarity may be determined based on the number of advertisement frames arranged in one page, and may be determined based on the colors and design of the site page.

In this case, when the acquisition unit of the advertisement distribution device 20 acquires the content information 4a of the content server 4 which is a posting destination of the advertisement information H, first, a genre determining unit of the advertisement distribution device 20 determines the genre of the content information 4a. A plurality of second databases DB2 indicating the relation between the specific position M and the attention degree index F is stored for each genre in the correction device 6. The advertisement distribution device 20 extracts the attention degree index F from the second database DB2 of the same genre based on the genre of the content information 4a determined by the genre determining unit.

Second Modification

When the advertisement information ranking unit P24 ranks a plurality of pieces of advertisement information H, the ranks may be determined based on two ranking processes. For example, a first ranking process may rank the advertisement information H based on the information on the content information 4a which is a posting destination of the advertisement information H. A second ranking process may rank the advertisement information H based on a behavior history of the user of the terminal 2.

The first ranking process is realized when a content acquisition unit of the advertisement distribution device 20 acquires the content information 4a. That is, the content of the content information 4a which is a distribution destination of the advertisement information H is acquired before distribution, and the advertisement information H that is expected to have a high advertisement effect is ranked to a high rank according to the content of the content information 4a.

The second ranking process ranks the advertisement information H that is expected to have a high advertisement effect on the user of the terminal 2 to a high rank based on attribute information such as a past site visit history, an item purchase history, an address, or an age, of the user of the terminal 2 which is a distribution destination of the advertisement information H. An attribute information acquisition unit of the advertisement distribution device 20 acquires the attribute information of the user by acquiring the attribute information such as cookie information from the terminal 2 and registration information associated with the user of the terminal 2 from another device connected to the Internet W.

The first and second ranking processes employ different logics for ranking the advertisement information H, but the advertisement information H to be distributed is common. That is, among a plurality of pieces of common advertisement information H, a plurality of pieces of advertisement information H is ranked based on the first ranking process, and the plurality of pieces of advertisement information H is ranked based on the second ranking process.

The advertisement information having a high rank determined based on the first ranking process may be distributed, the advertisement information having a high rank determined based on the second ranking process may be distributed, and the advertisement information having a high rank determined based on both the first and second ranking processes may be distributed.

There is no difference in the appearance of the advertisement information displayed in the page layout 4b regardless of the process used for the ranking. That is, the user cannot distinguish whether the advertisement information displayed in the page layout 4b is distributed based on the rank determined based on the first ranking process, the second ranking process, or both the first and second ranking processes when the user views the Web content information 4a.

Here, distribution of the advertisement information H can be realized with higher advertisement effects when the correction device 6 has a second database DB21 (FIG. 14A) based on the first ranking process and a second database DB22 (FIG. 14B) based on the second ranking process.

The correction device 6 stores the relation between the specific position M on the display screen and the attention degree index F when the advertisement information H is distributed based on the first ranking process as the second database DB21 and stores the relation between the specific position M on the display screen and the attention degree index F when the advertisement information H is distributed based on the second ranking process as the second database DB22.

When the ranks of the display areas Z1 to Z3 based on the second database DB21 are different from the ranks of the display areas Z1 to Z3 based on the second database DB22, the ranks may be weighted by an appropriate coefficient so that the ranks of the display areas Z1 to Z3 are adjusted further. For example, when the index value of the click rate C of the display area Z1 based on the first ranking process is 0.2 and the index value of the click rate C of the same display area Z1 based on the second ranking process is 0.3, the rank of the display area Z1 may be determined by weighting the rank based on the second database DB21 and the rank based on the second database DB22 by a weighting ratio of 60%:40%. When the rank based on the second database DB21 and the rank based on the second database DB22 are weighted by a weighting ratio of 60%:40%, and five pieces of advertisement information are displayed in the display area Z1, for example, three pieces of advertisement information having higher ranks based on the first ranking process and two pieces of advertisement information having higher ranks based on the second ranking process may be displayed. Moreover, for example, when advertisement information is displayed five times in the display area Z1, the advertisement information having a high rank based on the first ranking process may be displayed three times, and the advertisement information having a high rank based on the second ranking process may be displayed twice. The number or the ratio of distribution times of the advertisements based on the weightings of the first and second ranking processes may be adjusted such that the advertisements are distributed to multiple distribution destinations rather than one terminal 2. That is, it is sufficient that the ratio of impressions of the respective display areas is 60%:40% as the result of overall advertisement distribution.

The rank of the display area Z2 may be determined by weighting the rank based on the second database DB21 and the rank based on the second database DB22 by a weighting ratio of 30%:70%. The rank of the display area Z3 may be determined by weighting the rank based on the second database DB21 and the rank based on the second database DB22 by a weighting ratio of 20%:80%.

While the embodiments of the present invention have been described, the present invention is not limited to these embodiments, and various modifications and changes can be made within the scope of the spirit thereof.

The present invention also includes the following aspects.

An information distribution apparatus includes: an arrangement position acquisition unit configured to acquire each arrangement position of a plurality of pieces of distribution information on a display screen of a terminal that displays distribution information; an attention degree index extracting unit configured to extract each attention degree index of a plurality of arrangement positions based on acquisition of a specific position on the display screen of the terminal and an attention degree index indicating a degree of attention of the specific position; an arrangement position ranking unit configured to rank the plurality of arrangement positions based on the plurality of attention degree indices extracted by the attention degree index extracting unit; a distribution information ranking unit configured to rank the plurality of pieces of distribution information based on a predetermined ranking process; and a distribution unit configured to distribute the plurality of pieces of distribution information based on the ranks of the plurality of pieces of distribution information and the ranks of the plurality of arrangement positions.

The arrangement positions of the plurality of pieces of distribution information may be arrangement positions within first content information, the specific position and the attention degree index may be the specific position within second content information and the attention degree index thereof, and the first content information and the second content information may belong to the same genre among a plurality of genres that classifies the plurality of pieces of content information.

The distribution information may be ranked based on a first ranking process and a second ranking process, and the distribution unit may distribute the distribution information based on a rank obtained by adjusting the ranks of the plurality of pieces of distribution information based on the first ranking process and the ranks of the plurality of pieces of distribution information based on the second ranking process with a predetermined weighting coefficient.

An information distribution method causes a computer to execute: acquiring each arrangement position of a plurality of pieces of distribution information on a display screen of a terminal that displays distribution information; extracting each attention degree index of a plurality of arrangement positions based on acquisition of a specific position on the display screen of the terminal and an attention degree index indicating the degree of attention of the specific position; ranking the plurality of arrangement positions based on the plurality of attention degree indices extracted by the attention degree index extracting unit; ranking the plurality of pieces of distribution information based on a predetermined ranking process; and distributing the plurality of pieces of distribution information based on the ranks of the plurality of pieces of distribution information and the ranks of the plurality of arrangement positions.

A non-transitory computer readable storage medium having stored therein an information distribution program causes a computer to execute a process, the process comprising: acquiring each arrangement position of a plurality of pieces of distribution information on a display screen of a terminal that displays distribution information; extracting each attention degree index of a plurality of arrangement positions based on acquisition of a specific position on the display screen of the terminal and an attention degree index indicating the degree of attention of the specific position; ranking the plurality of arrangement positions based on the plurality of attention degree indices extracted by the attention degree index extracting unit; ranking the plurality of pieces of distribution information based on a predetermined ranking process; and distributing the plurality of pieces of distribution information based on the ranks of the plurality of pieces of distribution information and the ranks of the plurality of arrangement positions.

According to the present invention, it is possible to distribute distribution information such as advertisement information appropriately according to an attention degree of each display position on a display screen of a distribution destination terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An information distribution apparatus comprising:
a memory; and
a processor operatively coupled to the memory, the processor being programmed to:
acquire each arrangement position of a plurality of distribution information on a display screen of a terminal that displays content information;
extract each attention degree index of a plurality of arrangement positions within a same genre of content information based on: (i) acquisition of a specific position on the display screen of the terminal corresponding to each of the plurality of arrangement positions, and (ii) an attention degree index indicating a degree of attention of the specific position, the attention degree index being a click through rate of previously distributed distribution information based on a plurality of click through rates each corresponding to one pixel at the specific position within the same genre of content information displayed on the display screen;

rank the plurality of arrangement positions based on the plurality of extracted attention degree indices;

rank the plurality of distribution information based on a genre of the content information or a behavior of the user; and distribute the plurality of distribution information to be placed in the corresponding plurality of arrangement positions based on the ranks of the plurality of distribution information and the ranks of the plurality of arrangement positions on the display screen of the terminal.

2. The information distribution apparatus according to claim 1, wherein:

the arrangement positions of the plurality of distribution information are arrangement positions within first content information;

the specific position and the attention degree index are the specific position within second content information and the attention degree index of the second content information; and the first content information and the second content information belong to the same genre among a plurality of genres that classifies a plurality of content information.

3. The information distribution apparatus according to claim 2, wherein:

the distribution information is ranked based on a first ranking process and a second ranking process; and the processor is programmed to distribute the distribution information based on a rank obtained by adjusting the ranks of the plurality of distribution information based on the first ranking process and the ranks of the plurality of distribution information based on the second ranking process according to a predetermined weighting coefficient.

4. The information distribution apparatus according to claim 1, wherein the plurality of distribution information are ranked based on both the genre of the content information and the behavior of the user.

5. An information distribution method for causing a computer to execute:

acquiring each arrangement position of a plurality of distribution information on a display screen of a terminal that displays content information;

extracting each attention degree index of a plurality of arrangement positions within a same genre of content information based on: (i) acquisition of a specific position on the display screen of the terminal corresponding to each of the plurality of arrangement positions, and (ii) an attention degree index indicating a degree of attention of the specific position, the attention degree index being a click through rate of previously distributed distribution information based on a plurality of click through rates each corresponding to one pixel at the specific position within the same genre of content information displayed on the display screen;

ranking the plurality of arrangement positions based on the plurality of attention degree indices extracted;

ranking the plurality of distribution information based on a genre of the content information or a behavior of the user; and distributing the plurality of distribution information to be placed in the corresponding plurality of arrangement positions based on the ranks of the plurality of distribution information and the ranks of the plurality of arrangement positions onto the display screen of the terminal.

6. A non-transitory computer readable storage medium having stored therein an information distribution program causing a computer to execute a process, the process comprising:

acquiring each arrangement position of a plurality of distribution information on a display screen of a terminal that displays content information;

extracting each attention degree index of a plurality of arrangement positions within a same genre of content information based on: (i) acquisition of a specific position on the display screen of the terminal corresponding to each of the plurality of arrangement positions, and (ii) an attention degree index indicating a degree of attention of the specific position, the attention degree index being a click through rate of previously distributed distribution information based on a plurality of click through rates each corresponding to one pixel at the specific position within the same genre of content information displayed on the display screen;

ranking the plurality of arrangement positions based on the plurality of attention degree indices extracted;

ranking the plurality of distribution information based on a genre of the content information or a behavior of the user; and distributing the plurality of distribution information to be placed in the corresponding plurality of arrangement positions based on the ranks of the plurality of distribution information and the ranks of the plurality of arrangement positions onto the display screen of the terminal.

* * * * *